US 11,435,684 B2

(12) United States Patent
Saito (10) Patent No.: US 11,435,684 B2
(45) Date of Patent: Sep. 6, 2022

(54) POWER SUPPLY APPARATUS AND IMAGE FORMING APPARATUS

(71) Applicant: CANON KABUSHIKI KAISHA, Tokyo (JP)

(72) Inventor: Yusuke Saito, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/159,322

(22) Filed: Jan. 27, 2021

(65) Prior Publication Data

US 2021/0240120 A1 Aug. 5, 2021

(30) Foreign Application Priority Data

Feb. 3, 2020 (JP) .............................. JP2020-016037

(51) Int. Cl.
*G03G 15/00* (2006.01)
*H02M 3/335* (2006.01)

(52) U.S. Cl.
CPC ......... *G03G 15/5004* (2013.01); *G03G 15/80* (2013.01); *H02M 3/33523* (2013.01)

(58) Field of Classification Search
CPC .. G03G 15/5004; G03G 15/80; G03G 15/065; H02M 3/33523; H02M 1/0045; H02M 1/0093; H02M 3/06
See application file for complete search history.

(56) References Cited

U.S. PATENT DOCUMENTS

2008/0304851 A1* 12/2008 Kim .................. G03G 15/80
399/88
2015/0071663 A1* 3/2015 Yoshioka ............. G03G 15/065
399/50

FOREIGN PATENT DOCUMENTS

| JP | 2001-178133 A | | 6/2001 |
| JP | 2010145373 A | * | 7/2010 |
| JP | 2016-180931 A | | 10/2016 |
| JP | 6500544 B2 | | 4/2019 |

* cited by examiner

*Primary Examiner* — G. M. A Hyder
(74) *Attorney, Agent, or Firm* — Venable LLP (57) ABSTRACT

The power supply apparatus including a high-voltage generation unit generating a DC voltage VA includes a Zener diode that drops the DC voltage VA to a DC voltage VB, a resistor connected to a line to which the DC voltage VA is output, and a voltage divider that generates a DC voltage VC by dividing the DC voltage VA with the resistor, and the voltage divider adjusts the DC voltage VC such that the potential difference between the DC voltage VB and the DC voltage VC is within a predetermined range.

11 Claims, 4 Drawing Sheets

POWER SUPPLY APPARATUS AND IMAGE FORMING APPARATUS

BACKGROUND OF THE INVENTION

Field of the Invention

The present invention relates to a power supply apparatus and an image forming apparatus, and particularly relates to a circuit of a high-voltage power supply of an image forming apparatus.

Description of the Related Art

An image forming apparatus capable of performing image formation by using a plurality of colors of developers may apply a plurality of high voltages corresponding to the plurality of colors of developers, respectively. Japanese Patent No. 6500544 discloses, as an example of such an image forming apparatus, changing a high voltage by using a plurality of voltage divider circuits that includes a plurality of resistance elements in one voltage supply circuit.

A conventional power supply apparatus requires a plurality of voltage divider circuits in order to feed high voltages, such as the voltage applied to a developing roller and the voltage applied to a developing blade, for each of a plurality of developing apparatuses, and the manufacturing cost and the area of a substrate are increased. As a solution to this problem, there is a method of connecting one of high voltages (High Voltage 1) to a voltage supply circuit. However, in the conventional power supply apparatus, an output voltage higher than the output voltage of the voltage supply circuit cannot be supplied to a voltage divider circuit (High Voltage 2), and there is a limit to the high voltage that can be used. That is, in the conventional power supply apparatus, there is a possibility that the output voltage of High voltage 2 cannot be made higher than High Voltage 1 among a plurality of high voltages, with an inexpensive configuration.

SUMMARY OF THE INVENTION

An aspect of the present invention is a power supply apparatus capable of outputting the voltage of an arbitrary value to a plurality of high voltages with an inexpensive configuration.

Another aspect of the present invention is a power supply apparatus including a voltage generation unit configured to generate a first DC voltage, a voltage-drop element configured to drop the first DC voltage to a second DC voltage, a first resistor connected to a line to which the first DC voltage is output, and a first voltage dividing unit configured to generate a third DC voltage by dividing the first DC voltage with the first resistor, wherein the first voltage dividing unit includes an adjusting unit configured to adjust the third DC voltage so that a potential difference between the second DC voltage and the third DC voltage is within a predetermined range.

A further aspect of the present invention is an image forming apparatus including a power supply apparatus including a voltage generation unit configured to generate a first DC voltage, a voltage-drop element configured to drop the first DC voltage to a second DC voltage, a first resistor connected to a line to which the first DC voltage is output, and a first voltage dividing unit configured to generate a third DC voltage by dividing the first DC voltage with the first resistor, wherein the first voltage dividing unit includes an adjusting unit configured to adjust the third DC voltage so that a potential difference between the second DC voltage and the third DC voltage is within a predetermined range, a photosensitive member on which an electrostatic latent image is formed, and a developing unit including a developing roller configured to adhere toner to the photosensitive member, a regulating member for regulating the toner on the developing roller, and a feeding roller configured to feed the toner to the developing roller, the developing unit developing the electrostatic latent image with the toner to form a toner image, wherein the second DC voltage is applied to any one of the developing roller, the regulating member, and the feeding roller, and wherein among members of the developing roller, the regulating member, and the feeding roller, the third DC voltage is applied to either one of the members to which the second DC voltage is not applied.

A still further aspect of the present invention is an n image forming apparatus including a power supply apparatus including a second resistor connected to a line to which the first DC voltage is output, and a second voltage dividing unit configured to generate a fourth DC voltage by dividing the first DC voltage with the second resistor, a photosensitive member on which an electrostatic latent image is formed, and a developing unit including a developing roller configured to adhere a toner to the photosensitive member, a regulating member for regulating the toner on the developing roller, and a feeding roller configured to feed the toner to the developing roller, the developing unit developing the electrostatic latent image with the toner to form a toner image, wherein the second DC voltage is applied to the regulating member, wherein the third DC voltage is applied to the developing roller, and wherein the fourth DC voltage is applied to the feeding roller.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, forms for implementing the present invention will be described in detail with reference to the drawings by way of examples.

Embodiment 1

Embodiment 1 will describe a power supply apparatus capable of making the potential difference between the voltage applied to a developing roller and the voltage applied to a feeding roller positive and negative. An image forming apparatus will be described as an example of an electronic device on which a power supply apparatus is mounted.

[Configuration of Image Forming Apparatus]

Figure 1:
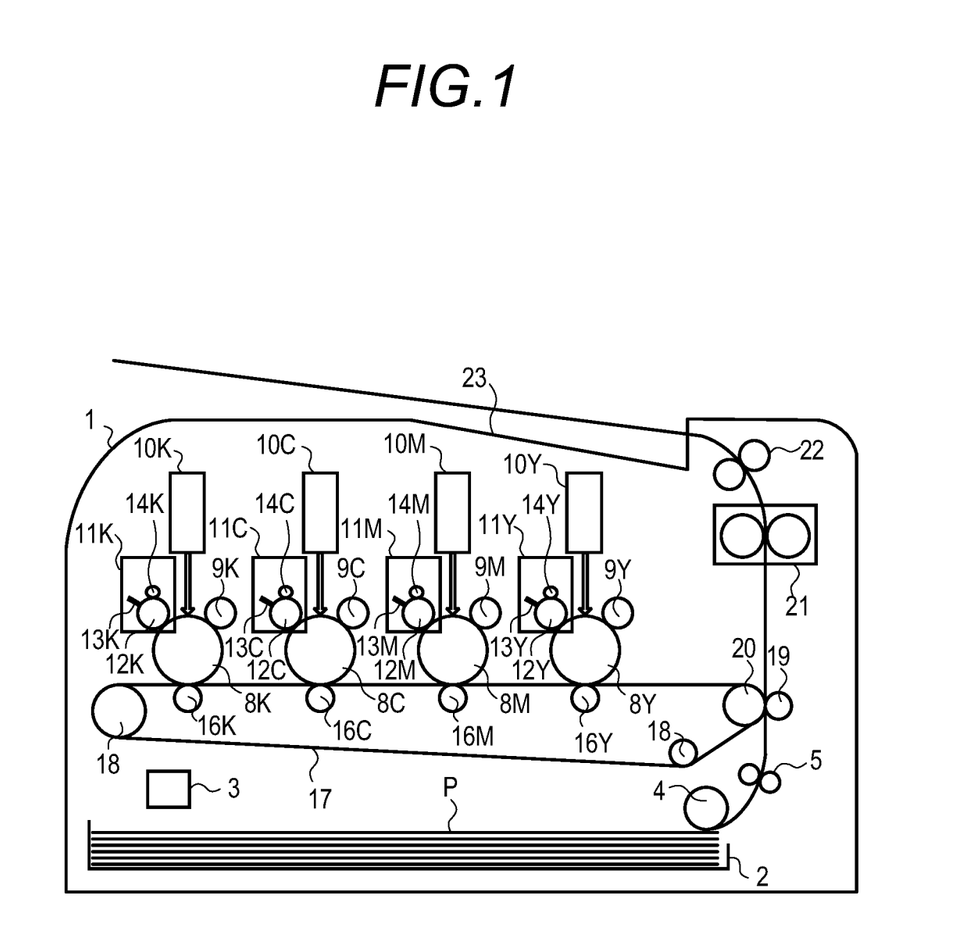
FIG. 1 is a cross-sectional view illustrating the configuration of an image forming apparatus of Embodiments 1 and 2.

FIG. 1 is a cross-sectional view illustrating the configuration of a tandem-type (four-drum system) image forming apparatus that employs an intermediate transfer belt. Each configuration of the image forming apparatus 1 is as follows. The image forming apparatus 1 includes a sheet feeding cassette 2 that stores sheet P, which is a recording medium, an image forming control unit 3 that controls the image forming operation, a sheet feeding roller 4 that feeds the sheet P from the sheet feeding cassette 2, and a conveyance roller 5 that conveys the fed sheet P. The image forming apparatus 1 includes photosensitive drums 8Y, 8M, 8C and 8K, which are photosensitive members bearing the developers of colors of yellow, magenta, cyan and black, respectively. Subscripts Y, M, C and K for the numeral mean the colors of yellow, magenta, cyan and black, respectively.

The image forming apparatus 1 includes charging rollers 9Y, 9M, 9C and 9K for uniformly charging the photosensitive drums 8Y, 8M, 8C and 8K to a predetermined potential, respectively, and optical units 10Y, 10M, 10C and 10K for forming electrostatic latent images by irradiating laser beams corresponding to the image data of respective colors on the photosensitive drums 8Y, 8M, 8C and 8K charged by the charging rollers 9Y, 9M, 9C and 9K, respectively. The image forming apparatus 1 includes developing units 11Y, 11M, 11C and 11K for visualizing the electrostatic latent images formed on the photosensitive drums 8Y, 8M, 8C and 8K, respectively.

The developing units 11Y, 11M, 11C and 11K include developing rollers 12 for sending out and adhering the developers inside the developing units 11Y, 11M, 11C and 11K to portions that opposes to the photosensitive drums 8Y, 8M, 8C and 8K, respectively. The developing units 11Y, 11M, 11C and 11K include regulating members (hereinafter called the developing blades) 13Y, 13M, 13C and 13K for regulating toners on the developing rollers in a thin layer, and feeding rollers 14Y, 14M, 14C and 14K for feeding the toners to the developing rollers 12Y, 12M, 12C and 12K, respectively. In the following description, the subscripts Y, M, C and K will be omitted, except for a case where a member related to a specific color is described.

The feeding roller 14 also has the function of stripping off the excessively fed toner when the value of the applied voltage is changed. Here, the voltage applied to the charging roller 9 is called the charging voltage, the voltage applied to the developing roller 12 is called the developing roller voltage, the voltage applied to the developing blade 13 is called the developing blade voltage, and the voltage applied to the feeding roller 14 is called the feeding roller voltage.

The image forming apparatus 1 includes a primary transfer roller 16 for transferring a toner image formed on the photosensitive drum 8 to an intermediate transfer belt 17. The transfer from the photosensitive drum 8 to the intermediate transfer belt 17 is called the primary transfer. The image forming apparatus 1 includes the intermediate transfer belt 17 bearing the primarily transferred toner image, and a driving roller 18 driving the intermediate transfer belt 17. The image forming apparatus 1 includes a secondary transfer roller 19 for transferring the toner image transferred on the intermediate transfer belt 17 to the sheet P. The transfer from the intermediate transfer belt 17 to the sheet P is called the secondary transfer. The image forming apparatus 1 includes a secondary transfer opposing roller 20 opposing to the secondary transfer roller 19, and a fixing unit 21 that melts and fixed the unfixed toner image transferred to the sheet P, while conveying the sheet P. The image forming apparatus 1 includes discharge rollers 22 discharging the sheet P onto which the fixation is performed by the fixing unit 21, and a discharge tray 23 loading the sheet P discharged by the discharge roller 22.

Next, the image forming operation of the image forming apparatus 1 will be described. When print data including a print command, image information, etc. is input to the image forming control unit 3 from a host computer (not illustrated), etc., the image forming apparatus 1 starts a print operation. Accordingly, the sheet P is fed by the sheet feeding roller 4 from the sheet feeding cassette 2, and is sent out to a conveyance path. With the operation of feeding the sheet P, the photosensitive drum 8 is charged to a certain potential by the charging roller 9. The optical unit 10 exposes and scans the surface of the charged photosensitive drum 8 by a laser beam to form an electrostatic latent image according to the input print data. Development is performed by the developing roller 12, the developing blade 13, and the feeding roller 14 of the developing unit 11 in order to visualize the formed electrostatic latent image. The electrostatic latent image formed on the surface of the photosensitive drum 8 is developed by the developing unit 11 as an image with each color, and a toner image is formed. The photosensitive drum 8 contacts the intermediate transfer belt 17, and rotates in synchronization with the rotation of the intermediate transfer belt 17. Each toner image formed on each photosensitive drum 8 is sequentially transferred and superimposed on the intermediate transfer belt 17 by each primary transfer roller 16. Then, the toner image is transferred onto the sheet P by the secondary transfer roller 19 and the secondary transfer opposing roller 20. The toner image transferred to the sheet P is fixed by the fixing unit 21 including fixing rollers, etc. The sheet P to which the toner image has been fixed is discharged to the discharge tray 23 by the discharge rollers 22, and the image forming operation ends. Note that the image forming apparatus on which the power supply apparatus of the present invention is mounted is not limited to the configuration described in FIG. 1, and may be, for example, an image forming apparatus including, instead of the intermediate transfer belt, a conveying belt that conveys the sheet P, or a monochrome image forming apparatus.

[Power Supply Apparatus]

Figure 2A:
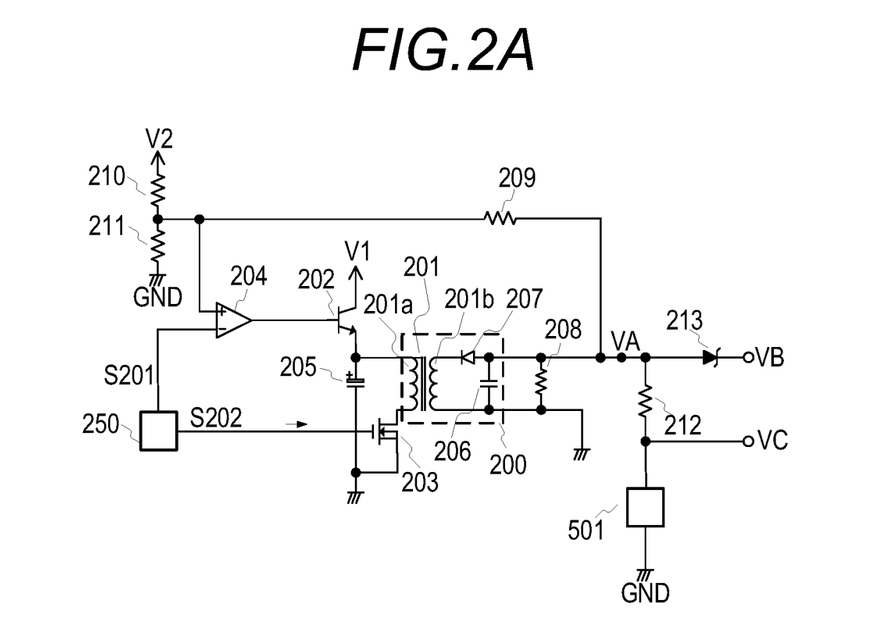
FIG. 2A and FIG. 2B are diagrams illustrating a high voltage circuit of Embodiment 1.

FIG. 2A illustrates the circuit of the power supply apparatus that outputs a high voltage of Embodiment 1. The power supply apparatus includes a transformer 201, an NPN-type transistor 202, an Nch-type FET 203, an operational amplifier 204, and an electrolytic capacitor 205. The power supply apparatus includes a ceramic capacitor 206, a diode 207, fixed resistors (hereinafter called the resistors) 208 to 212, and a Zener diode 213, which is a voltage-drop element. The transformer 201 includes a primary winding 201a and a secondary winding 201b. The FET 203, which is a switching element, is connected in series to the primary winding 201a of the transformer 201. The Zener diode 213 is a Zener diode with a breakdown voltage Vz. The transformer 201, the ceramic capacitor 206, and the diode 207 form a high-voltage generation unit 200, which is a voltage generation unit. V1 indicates an input voltage, and V2 indicates a reference voltage.

Next, using FIG. 2A, the operation of the power supply apparatus will be described. S202 is a pulse signal for switching and driving the transformer 201 transmitted from a controller 250, which is a first control unit that controls the power supply apparatus, and is input to a gate terminal of the FET 203. For the pulse signal S202, a square wave fixed at, for example, 50 kHz frequency, 25% on-duty, and 5 V amplitude is used. When the pulse signal S202 is input to the gate terminal of the FET 203, the FET 203 repeats the turning on/off operation (switching operation) according to the pulse signal S202. When the FET 203 is turned on/off, the DC voltage at both ends of the electrolytic capacitor 205 is applied as a pulsed waveform to the primary winding 201a of the transformer 201. Accordingly, the high-voltage generation unit 200 generates the voltage of negative polarity (hereinafter called the negative voltage). That is, the stepped-up pulsed voltage having the same period as the pulse signal S202 is output from a secondary side of the transformer 201. The pulsed voltage (the voltage induced on the secondary side) output from the secondary side of the transformer 201 is smoothed by a rectifying smoothing circuit, which is a smoothing and rectifying unit including the diode 207 and the ceramic capacitor 206. A high voltage DC voltage VA, which is a first DC voltage smoothed by the rectifying smoothing circuit, appears in both the ends of the ceramic capacitor 206. The DC voltage VA is input to a non-inverted input terminal (+ terminal) of the operational amplifier 204. That is, the DC voltage VA is fed back to the operational amplifier 204 via the resistor 209. The resistor 208 is a bleeder resistor for obtaining a stable output voltage.

The input signal S201 is an input signal for adjusting the high voltage DC voltage VA transmitted from the controller 250 controlling the power supply apparatus to a predetermined voltage value, and is a DC voltage corresponding to the DC voltage VA. The input signal S201 is input to an inverted input terminal (− terminal) of the operational amplifier 204. In the operational amplifier 204, the voltage obtained by dividing the reference voltage V2 by the resistor 210 and the resistor 211 is input to the inverted input terminal, and an output terminal is connected to a base terminal of the transistor 202. Accordingly, the operational amplifier 204 changes the voltage output from the output terminal according to the reference voltage V2, the respective resistance values of the resistor 210 and the resistor 211, and the input signal S201. Then, when the base voltage of the transistor 202 is changed, the DC voltage at both ends of the electrolytic capacitor 205 is changed. That is, the DC voltage VA can be variably controlled by the input signal S201.

As illustrated in FIG. 2A, a negative voltage is output from the transformer 201. The anode side of the Zener diode 213 is connected to the DC voltage VA, and a high voltage DC voltage VB, which is a second DC voltage, is output to the cathode side. In the resistor 212, which is a first resistor, one end is connected to a line to which the DC voltage VA is output, and the other end is connected to a voltage divider 501, which is a first voltage dividing unit on the secondary side. It is assumed that the voltage obtained by dividing the DC voltage VA by the resistor 212 and the voltage divider 501, i.e., the potential between the resistor 212 and the voltage divider 501, is a high voltage DC voltage VC, which is a third DC voltage.

Application Examples

Figure 2B:
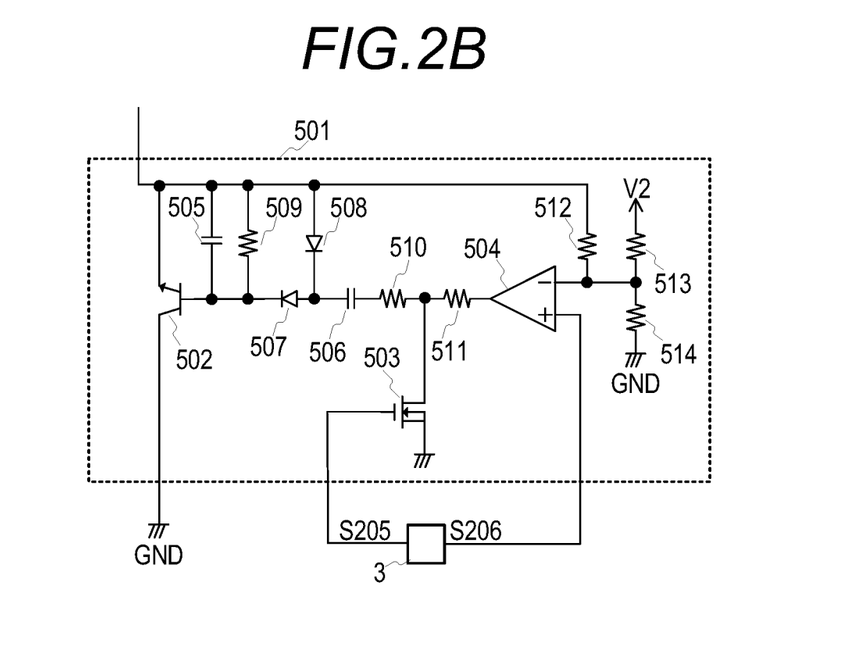

As an example, a case where the high voltage DC voltage VB is applied to the developing roller 12, and the high voltage DC voltage VC is applied to the feeding roller 14 will be described. The voltage divider 501 has the function that can change the impedance by a high breakdown voltage transistor, a photo coupler, etc., which are impedance elements. As an example, a circuit using a high breakdown voltage transistor is illustrated in FIG. 2B, and the operation will be described.

[Operation of Voltage Divider 501]

The voltage divider 501 includes an NPN transistor (hereinafter called the transistor) 502, an FET 503, an operational amplifier 504, capacitors 505 and 506, diodes 507 and 508, and resistors 509 to 514. The resistor 512 is a voltage detection resistor. The voltage divider 501 provides the transistor 502 having a high breakdown voltage between the high voltage DC voltage VC and the ground (hereinafter written as the GND), and variably controls a voltage Vce between the collector and emitter of the transistor 502 and a collector current Ic. Here, the voltage Vce between the collector and emitter of the transistor 502 is the DC voltage VC. Accordingly, an arbitrary voltage can be applied to the DC voltage VC. Assuming that the impedance between the collector and emitter of the transistor 502 is Rz, the DC voltage VB and the DC voltage VC are represented by the following formula (1) and formula (2). Note that it is assumed that the resistance value of the resistor 212 is R212.

$$VB = VA + Vz \quad (1)$$

$$VC = VA \times Rz/(R212 + Rz) \quad (2)$$

As an example, it is assumed that a breakdown voltage Vz is 200 V, and R212 is 1 MΩ.

(1) When Stripping Off the Excessive Toner on the Developing Roller by the Feeding Roller When the toner excessively supplied and remaining on the developing roller 12 is stripped off by the feeding roller 14, the absolute value of the DC voltage VC needs to be smaller than the absolute value of the DC voltage VB (|VB|>|VC|). First, the operation at the time of outputting −300 V and −200 V to the DC voltage VB and the output voltage VC, respectively, will be described by using FIG. 2B. The DC voltage VB is determined by the DC voltage VA and the breakdown voltage Vz from the formula (1). That is, since the potential difference is created by the breakdown voltage Vz (=200 V) with the Zener diode 213 when the DC voltage VA is controlled to be −500 V, −300 V (=−500 V+200 V) is output to the DC voltage VB. The controller 250 can control the DC voltage VB to be −300 V by controlling the DC voltage VA to be −500 V with the input signal S201.

On the other hand, when it is desired to output −200 V to the DC voltage VC in a state where the DC voltage VA is controlled to be −500 V, the impedance Rz is controlled to be 0.67 MΩ based on the formula (2). That is, the voltage Vce between the collector and emitter of the transistor 502 is controlled to be −200 V. At this time, a voltage of about 200 V is applied to both ends of the resistor 512. Therefore, the resistor 512 needs to use a component having a high breakdown voltage and a high resistance value, and to be used under conditions satisfying the breakdown voltage and nominal power of the component. With the voltage divider 501, a maximum value VCmax of the DC voltage VC is a value at the time when the transistor 502 is in a turn-off state, and can be calculated by the following formula (3) using the resistor 212 and the resistor 512. Note that, since the resistor 513 and the resistor 514 have resistance values sufficiently small compared with the resistor 212 and the resistor 512, even when the values of the resistors 513 and 514 are omitted, there will be no influence.

$$VCmax = VA \times R512/(R512 + R212) \quad \text{Formula (3)}$$

On the other hand, the minimum output value of the DC voltage VC is the value (Vce=0 V) at the time when the transistor 502 is ON, i.e., 0 V. From the above, the DC voltage VC can be changed between 0 to VCmax by the voltage divider 501 (0≤VC≤VCmax). In order to detect the value of the DC voltage VC, the resistor 512 is connected to a line leading to the DC voltage VC. The voltage obtained by dividing the DC voltage VC by the resistor 512 and the resistor 514, and the voltage obtained by dividing the reference voltage V2 by the resistor 513 and the resistor 514 are input to an inverted input terminal of the operational amplifier 504. An input signal S206 is input to a non-inverted input terminal of the operational amplifier 504. The input signal S206 is an input signal for adjusting the DC voltage VC transmitted from the image forming control unit 3, which is a second controller, and is a DC voltage corresponding to the DC voltage VC. In this manner, the image forming control unit 3 also controls the power supply apparatus. Assuming that the voltage value input to the inverted input terminal of the operational amplifier 504 is Vin−, the following formula (4) is established.

$$Vin-=(VA \times R513 \times R514+V2 \times R512 \times R514)/(R512 \times R513+R513 \times R514+R512 \times R514) \quad \text{Formula (4)}$$

The operational amplifier 504 outputs a voltage such that the voltage of the inverted input terminal becomes equal to the voltage value of the input signal S206 connected to the non-inverted input terminal. The capacitor 506 is a high breakdown voltage capacitor, and separates a high-voltage portion (the left side of the capacitor 506 in the diagram) including the transistor 502, etc., from a low-voltage portion (the right side of the capacitor 506 in the diagram) including the operational amplifier 504, etc. S205 is a pulse wave signal for driving the voltage divider 501, and is input to a gate terminal of the FET 503. For the pulse signal S205, a square wave fixed at, for example, 50 kHz frequency, 50% on-duty, and 5 V amplitude is used. The FET 503 performs the turn on/off operation when the pulse signal S205 is input to the gate terminal. By performing the turn on/off operation by the FET 503, the voltage output from an output terminal of the operational amplifier 504 becomes a pulse voltage, and is applied to one end of the capacitor 506 via the resistors 511 and 510. A pulse voltage according to the pulse voltage applied to the one end appears in the other end of the capacitor 506.

The pulse voltage appearing in the other end of the capacitor 506 is connected to the anode side of the diode 507, and the cathode side of the diode 508, and is smoothed by a rectifying smoothing circuit including the diodes 507 and 508, the capacitor 505, and the resistor 509 for electric discharging. The smoothed and rectified voltage is input to a base terminal of the transistor 502, and is applied between the base and the emitter. From the above, in this voltage divider 501, a base current according to the output voltage of the operational amplifier 504 flows into the transistor 502, and serves as the voltage Vce between the collector and emitter of the transistor 502. In this manner, the image forming control unit 3 can control the DC voltage VC to a predetermined voltage value by the input signal S206. The DC voltage VC is controlled to a voltage corresponding to the input signal S206 in the range of 0 to VCmax. In this manner, at least the operational amplifier 504 and the transistor 502 function as adjusting units that adjust the DC voltage VC.

(2) When Feeding a Toner from the Developing Roller to the Feeding Roller

Next, when feeding a toner to the developing roller 12 from the feeding roller 14, the absolute value of the DC voltage VC needs to be greater than the absolute value of the DC voltage VB (|VB|<|VC|). For example, the DC voltage VB needs to be set to −300 V, and the DC voltage VC needs to be set to −450 V. Similar to when stripping off the toner, since the potential difference is created by the breakdown voltage Vz (200 V) with the Zener diode 213 when the DC voltage VA is controlled to be −500 V, −300 V is output to the DC voltage VB. On the other hand, when it is desired to output −450 V to the DC voltage VC in a state where the DC voltage VA is controlled to be −500 V, the impedance Rz is controlled to be 9 MΩ. That is, the image forming control unit 3 controls the voltage Vce between the collector and emitter of the high breakdown voltage transistor 502 to be −450 V. As described above, the image forming control unit 3 controls the DC voltage VC to be −450 V by controlling the voltage Vce with the input signal S206.

As described above, according to Embodiment 1, the DC voltage VC can be a voltage higher than the DC voltage VB, and can also be a voltage lower than the DC voltage VB with an inexpensive configuration. In this manner, when adjusting the voltage applied to the feeding roller 14 to control the amount of toner on the developing roller 12, the voltage applied to the feeding roller 14 can be generated from the same high-voltage generation unit 200 as the voltage applied to the developing roller 12.

Additionally, the DC voltage VB may be changed according to usage conditions. For example, the DC voltage VB is set to −250 V. At this time, in order to make the potential difference between the DC voltage VB and the DC voltage VC constant, it is desirable to control the DC voltage VA to be −450 V, the DC voltage VB to be −250 V, and the DC voltage VC to be −400 V. This case can also be realized by, as described above, controlling the DC voltage VA to be −450 V with the input signal S201, and controlling the impedance Rz such that the DC voltage VC becomes −400 V with the input signal S206.

In addition, according to usage conditions, the potential difference between the DC voltage VB and the DC voltage VC may be changed. Also in this case, as described above, the potential difference between the DC voltage VB and the DC voltage VC can be varied by controlling the DC voltage VA with the input signal S201, and controlling the DC voltage VC with the input signal S206.

Additionally, although the DC voltage VA, which is the output voltage of the high-voltage generation unit 200, is fed back to the operational amplifier 204, the feedback may be performed by other methods. For example, the accuracy of the output value of the DC voltage VB can also be improved by feeding back the DC voltage VB on the cathode side of the Zener diode 213 to the operational amplifier 204. In addition, although the Zener diode 213 is used as a voltage drop element, the voltage drop element is not limited to a Zener diode, and any element, such as a varistor, can be applied as long as the element drops a predetermined voltage.

Figure 3:
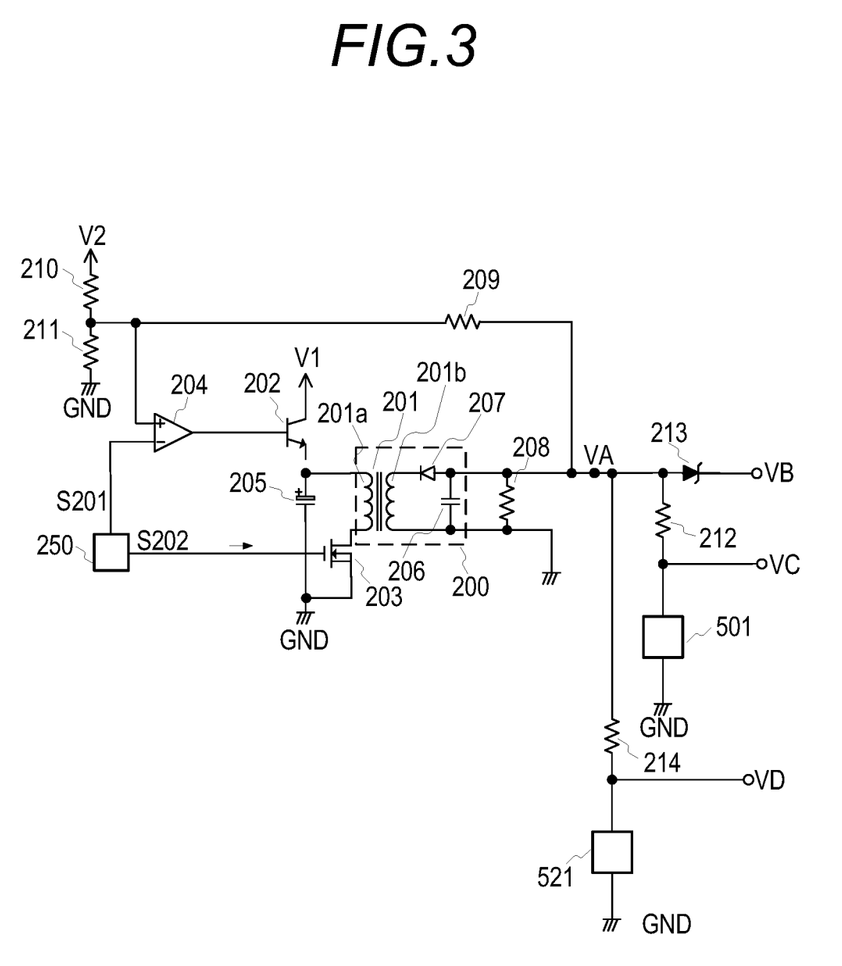
FIG. 3 is a diagram illustrating the high voltage circuit of Embodiment 1.

Further, although the DC voltage VB is applied to the developing roller 12, and the DC voltage VC is applied to the feeding roller 14, the application destinations may be anywhere. For example, the DC voltage VB may be supplied to the developing blade 13, and the DC voltage VC may be supplied to the developing roller 12. That is, the DC voltage VB may be applied to any member of the developing roller 12, the developing blade 13 and the feeding roller 14. Then, the DC voltage VC may be applied to any other member of the developing roller 12, the developing blade 13 and the feeding rollers 14 different from the member to which the DC voltage VB is applied. Additionally, for example, it may be as illustrated in FIG. 3. FIG. 3 is a circuit diagram of the power supply apparatus that outputs the DC voltage VD, which is a fourth DC voltage, in addition to the DC voltages VA, VB and VC. Note that the same numerals are given to the same configurations as in FIG. 2A, and a description is omitted. As illustrated in FIG. 3, one end of the resistor 214, which is a second resistor, is connected to the DC voltage VA, and the voltage divider 521, which is a second voltage dividing unit, is added to the other end of the resistor 214. The voltage divider 521 has the same configuration as the voltage divider 501, and a description is omitted. It is assumed that the potential between the resistor 214 and the voltage divider 521 is the DC voltage VD. At this time, for example, the DC voltage VB can also be applied to the developing blade 13, the DC voltage VC can also be applied to the developing roller 12, and the DC voltage VD can also be applied to the feeding roller 14.

As described above, according to Embodiment 1, a power supply apparatus that outputs the voltage of an arbitrary value to a plurality of high voltages with an inexpensive configuration, and an image forming apparatus including the power supply apparatus can be realized.

Embodiment 2

[Starting Up Sequence]

Figure 4A:
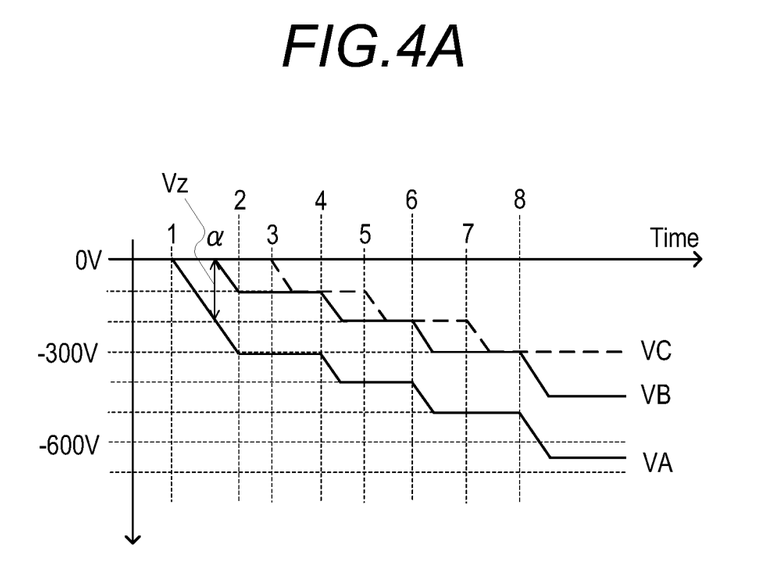
FIG. 4A and FIG. 4B are timing charts illustrating the control of the high voltage of Embodiment 2.

The starting up sequence of the power supply apparatus of FIG. 2A will be described by using FIG. 4A. FIG. 4A is a graph illustrating time on a horizontal axis, and DC voltage (V) on a vertical axis. In this graph, the DC voltages VA and VB are represented by solid lines, and the DC voltage VC is represented by a broken line. When raising each DC voltage, the output voltage is controlled by using the input signal S201, the pulse signal S202, the pulse signal S205, and the input signal S206. When each signal is turned on simultaneously, the DC voltage VB is not be output until the DC voltage VA reaches (becomes substantially equal to) the breakdown voltage Vz of the Zener diode 213. Therefore, a larger output voltage in the negative direction is output in the DC voltage VC than the DC voltage VB. In a case where the DC voltage VB is connected to the developing blade 13, and the DC voltage VC is connected to the developing roller 12, when a larger voltage in the negative direction is applied to the DC voltage VC than the DC voltage VB, a toner may be fused to the developing blade 13, and an image defect may occur. Additionally, when the potential difference between the voltage applied to the developing blade 13 and the voltage applied to the developing roller 12 becomes greater than a predetermined potential difference, a discharge phenomenon may also occur between the developing blade 13 and the developing roller 12, and an image defect may occur.

Therefore, in Embodiment 2, the ON timing and OFF timing of the output are controlled by using the input signal S201, the pulse signal S202, the pulse signal S205, and the input signal S206. Accordingly, raising and lowering of each voltage can be performed while maintaining the potential difference between a plurality of DC voltages within a predetermined range. For example, raising is performed such that the potential difference between two DC voltages falls within the range of 0 V to 100 V.

At a time 1 in FIG. 4A, the DC voltage VA is raised to be a predetermined voltage (for example, −300 V) by using the input signal S201 and the pulse signal S202. The DC voltage VB is not output until a time α when the DC voltage VA reaches the breakdown voltage Vz (for example, 200 V) of the Zener diode 213. After the DC voltage VA reaches the breakdown voltage Vz at the time α, a voltage having a constant potential difference corresponding to the breakdown voltage Vz with respect to the DC voltage VB is output to the DC voltage VA. At this time, a voltage greater in the negative direction than the output voltage VB can be prevented from being applied to the DC voltage VC, by controlling the DC voltage VC to be 0 V by using the pulse signal S205 and the input signal S206. For example, the DC voltage VC is controlled to be 0 V until a time 3 is reached.

At a time 2, the DC voltage VA reaches a predetermined voltage (for example, −300 V), and the DC voltage VB is raised to a predetermined voltage (for example, −100 V). At the time 3, the control is started such that the DC voltage VC becomes a predetermined voltage (for example, −100 V) by using the pulse signal S205 and the input signal S206. At a time 4, the DC voltage VA is controlled to be a predetermined voltage (for example, −400 V) by using the input signal S201 and the pulse signal S202. When the DC voltage VA reaches −400 V, the DC voltage VB becomes −200 V.

At a time 5, the DC voltage VC is controlled to be a predetermined voltage (for example, −200 V) by using the pulse signal S205 and the input signal S206. At a time 6, the DC voltage VA is controlled to be a predetermined voltage (for example, −500 V) by using the input signal S201 and the pulse signal S202. When the DC voltage VA reaches −500 V, the DC voltage VB becomes −300 V. At a time 7, the DC voltage VC is controlled to be a predetermined voltage (for example, −300 V) by using the pulse signal S205 and the input signal S206. At a time 8, the DC voltage VA is controlled to be a predetermined voltage (for example, −650 V) by using the input signal S201 and the pulse signal S202. When the DC voltage VA reaches −650 V, the DC voltage VB becomes −450 V.

As described above, the DC voltage VB and the DC voltage VC can be raised to predetermined voltages in a state where the DC voltage VB and the DC voltage VC maintain a predetermined potential difference (0 V to 100 V), by controlling each of the input signal S201, the pulse signal S202, the pulse signal S205, and the input signal S206.

[Shutting Down Sequence]

Figure 4B:
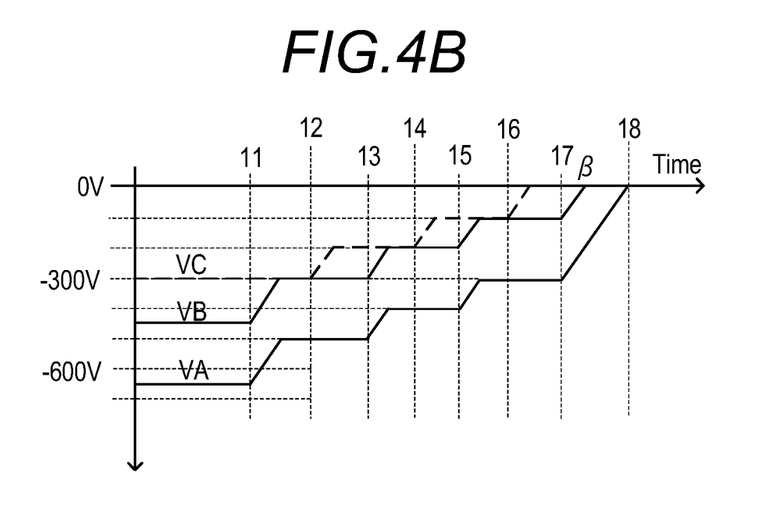

Next, using FIG. 4B, a shutting down sequence in a state where the potential difference between the DC voltage VB and the DC voltage VC is maintained within a predetermined potential difference range will be described. FIG. 4B is a graph illustrating time on a horizontal axis, and DC voltage (V) on a vertical axis. In this graph, the DC voltages VA and VB are represented by solid lines, and the DC voltage VC is represented by a broken line.

At a time 11 in FIG. 4B, the DC voltage VA is lowered to a predetermined voltage (for example, −500 V) by using the input signal S201 and the pulse signal S202. When the DC voltage VA reaches −500 V, the DC voltage VB becomes −300 V. At this time, the DC voltage VC is controlled to be −300 V, and the potential difference with the DC voltage VB is zero volts. At a time 12, the DC voltage VC is controlled to a predetermined voltage (for example, −200 V) by using the pulse signal S205 and the input signal S206. At this time, the DC voltage VB is −300 V, and the potential difference with the DC voltage VC is 100 V. At a time 13, the DC voltage VA is controlled to a predetermined voltage (for example, −400 V) by using the input signal S201 and the pulse signal S202. When the DC voltage VA reaches −400 V, the DC voltage VB becomes −200 V. At a time 14, the DC voltage VC is controlled to a predetermined voltage (for example, −100 V) by using the pulse signal S205 and the input signal S206.

At a time 15, the DC voltage VA is controlled to a predetermined voltage (for example, −300 V) by using the input signal S201 and the pulse signal S202. When the DC voltage VA reaches −300 V, the DC voltage VB becomes −100 V. At a time 16, the DC voltage VC is controlled to a predetermined voltage (for example, 0 V) by using the pulse signal S205 and the input signal S206. At a time 17, the DC voltage VA is controlled to a predetermined voltage (for example, 0 V) by using the input signal S201 and the pulse signal S202. The DC voltage VB becomes 0 V at a time β earlier than a time 18 when the DC voltage VA becomes 0 V. In this manner, the DC voltage VB and the DC voltage VC can be lowered to predetermined voltage while maintaining a state where the DC voltage VB and the DC voltage VC have a predetermined potential difference, by controlling each of the input signal S201, the pulse signal S202, the pulse signal S205, and the input signal S206.

As described above, also in Embodiment 2, the configuration is assumed in which the DC voltage VB applied to the developing blade 13 is adjusted to regulate the toner on the developing roller 12, and the DC voltage VB is generated from the same high-voltage generation unit 200 as the DC voltage VC applied to the developing roller 12. Additionally, the starting up and shutting down sequences of the power supply apparatus are controlled by using the input signal S201, the pulse signal S202, the pulse signal S205, and the input signal S206. Accordingly, the potential difference between the DC voltage VB and the DC voltage VC can be maintained within a predetermined range. Note that the predetermined range (for example, 0 V to 100 V) for the potential difference between the DC voltage VB and the DC voltage VC is set to a range in which an image defect does not occur, according to an individual image forming apparatus.

As described above, according to Embodiment 2, a power supply apparatus that outputs the voltage of an arbitrary value to a plurality of high voltages with an inexpensive configuration, and an image forming apparatus including the power supply apparatus can be realized.

Note that, in above-described Embodiments 1 and 2, the power supply apparatus has been described in which the signal for controlling the power supply apparatus is output by controller 250. However, the power supply apparatus in which the signal for controlling the power supply apparatus is output from the image forming control unit 3 without using the controller 250 can also be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-016037, filed Feb. 3, 2020, which is hereby incorporated by reference herein in its entirety.

What is claimed is:

1. An image forming apparatus comprising:
   a voltage generation unit configured to generate a first DC voltage;
   a voltage-drop element configured to drop the first DC voltage to a second DC voltage;
   a first resistor connected to a line to which the first DC voltage is output;
   a first voltage dividing unit configured to generate a third DC voltage by dividing the first DC voltage with the first resistor;
   a photosensitive member on which an electrostatic latent image is formed;
   a developing unit including a developing roller, a regulating member configured to regulate toner on the developing roller, and a feeding roller configured to feed the toner to the developing roller, the developing unit developing the electrostatic latent image with the toner to form a toner image,
   wherein the second DC voltage is applied to any one of the developing roller, the regulating member, and the feeding roller, and
   wherein among members of the developing roller, the regulating member, and the feeding roller, the third DC voltage is applied to either one of the members to which the second DC voltage is not applied; and
   a control unit configured to control the first voltage dividing unit so that an absolute value of the second DC voltage becomes larger than an absolute value of the third DC voltage in a first operation state of the developing unit, and configured to control the first voltage dividing unit so that the absolute value of the third DC voltage becomes larger than the absolute value of the second DC voltage in a second operation state of the developing unit.

2. An image forming apparatus according to claim 1, wherein the control unit controls the first voltage dividing unit so that in a case where the toner on the developing roller is stripped off by the feeding roller, the absolute value of the second DC voltage becomes larger than the absolute value of the third DC voltage, and so that in a case where the toner is fed from the feeding roller to the developing roller, the control unit controls the first voltage dividing unit, the absolute value of the second DC voltage becomes smaller than the absolute value of the third DC voltage.

3. An image forming apparatus according to claim 1, wherein in a case of starting up the power supply apparatus, the control unit controls the third DC voltage to be zero volts until a potential difference between the first DC voltage and the second DC voltage becomes equal to a breakdown voltage of the voltage-drop element, and then, controls the first DC voltage, the second DC voltage and the third DC voltage to be raised in a state where the potential difference between the second DC voltage and the third DC voltage is within the predetermined range.

4. An image forming apparatus according to claim 1, wherein in a case of shutting down the power supply apparatus, the control unit controls the first DC voltage, the second DC voltage and the third DC voltage to be lowered in a state where the potential difference between the second DC voltage and the third DC voltage is within the predetermined range, and then, controls the third DC voltage to be zero volts in a state where a potential difference between the first DC voltage and the second DC voltage is equal to a breakdown voltage of the voltage-drop element.

5. An image forming apparatus according to claim 1, wherein the second DC voltage is applied to the developing roller, and
wherein the third DC voltage is applied to the feeding roller.

6. The image forming apparatus according to claim 1, wherein the first voltage dividing unit includes an impedance element configured to change an impedance value, and the control unit is configured to adjust the third DC voltage by changing the impedance value.

7. The image forming apparatus according to claim 6, wherein the impedance element is a transistor or a photo coupler.

8. The image forming apparatus according to claim 1, wherein the voltage-drop element is a Zener diode or a varistor.

9. The image forming apparatus according to claim 1, wherein the voltage generation unit includes:

a transformer including a primary winding and a secondary winding;

a switching element connected in series to the primary winding;

a smoothing and rectifying unit configured to smooth and rectify a voltage induced in the secondary winding; and a switching control unit configured to control turning on and off of the switching element, wherein the first DC voltage is a voltage smoothed and rectified by the smoothing and rectifying unit.

10. The image forming apparatus according to claim 1 further comprising:

a second resistor connected to a line to which the first DC voltage is output; and a second voltage dividing unit configured to generate a fourth DC voltage by dividing the first DC voltage with the second resistor, wherein the second DC voltage is applied to the regulating member, wherein the third DC voltage is applied to the developing roller, and wherein the fourth DC voltage is applied to the feeding roller.

11. The image forming apparatus according to claim 1, wherein the second DC voltage is applied to the regulating member, and the third DC voltage is applied to the developing roller.

* * * * *